United States Patent [19]

Mochizuki

[11] Patent Number: 5,432,641
[45] Date of Patent: Jul. 11, 1995

[54] ELECTRICALLY POWERED FOLDABLE OUTER REARVIEW MIRRORS FOR MOTOR VEHICLES

[75] Inventor: Toshihiro Mochizuki, Fujieda, Japan

[73] Assignee: Murakami Kaimeido Co., Ltd., Shizuoka, Japan

[21] Appl. No.: 42,154

[22] Filed: Apr. 2, 1993

[30] Foreign Application Priority Data

Sep. 16, 1992 [JP] Japan .................. 4-070387 U

[51] Int. Cl.⁶ .................. G02B 5/08; G02B 7/182
[52] U.S. Cl. .................. 359/841; 359/872; 359/873; 359/877
[58] Field of Search .............. 359/841, 877, 871, 872, 359/873, 874, 876; 248/476, 477, 478, 479

[56] References Cited

U.S. PATENT DOCUMENTS

| | | | |
|---|---|---|---|
| 4,606,619 | 8/1986 | Yamana et al. | 248/478 |
| 4,626,083 | 12/1986 | Nakayama et al. | 359/841 |
| 4,626,084 | 12/1986 | Kumai | 359/841 |
| 4,681,409 | 7/1987 | Enomoto | 248/478 |
| 4,981,349 | 1/1991 | Tamiya et al. | 359/872 |
| 4,982,926 | 12/1991 | Mori et al. | 359/841 |
| 4,988,068 | 1/1991 | Yamana et al. | 248/478 |
| 5,190,499 | 3/1993 | Mori et al. | 359/841 |
| 5,315,442 | 5/1994 | Sato et al. | 359/841 |

FOREIGN PATENT DOCUMENTS

3-16841 1/1991 Japan .
3-69552 7/1991 Japan .

Primary Examiner—Loha Ben
Assistant Examiner—John Juba, Jr.
Attorney, Agent, or Firm—Michael J. Striker

[57] ABSTRACT

The rearview mirror has a shaft attached to a base, a mirror body rotatably mounted on the shaft, a frame fixed to the mirror body, an electric drive motor and a speed reduction gear mechanism fixed to the frame, and a clutch gear mounted on the shaft and engaged with a final stage gear of the speed reduction gear mechanism. The clutch gear has a clutch device for halting the mirror body in a mirror erected position including teeth circumferentially disposed on the undersurface of the clutch gear, ball holding recesses in the upper surface of the frame root portion and steel balls located between the clutch gear undersurface and the frame root portion upper surface and engagable with the teeth so as to be engagable in and disengagable from the ball holding recesses; and a clutch device for avoiding shocks due to halting the mirror body including ball retaining recesses in the clutch gear upper surface, a ball guide having throughgoing holes and steel balls engaged in the throughgoing holes of the ball guide and engagable in and disengagable from the ball retaining recesses to restrain the frame from unnecessary vertical motion during operation so that mirror surface chattering is prevented and the clutch gear load is relieved.

3 Claims, 5 Drawing Sheets

ELECTRICALLY POWERED FOLDABLE OUTER REARVIEW MIRRORS FOR MOTOR VEHICLES

BACKGROUND OF THE INVENTION

The present invention relates to an electrically powered foldable outer rearview mirror for a motor vehicle.

An electrically powered foldable outer rearview mirror for a motor vehicle is known comprising a mirror body rotatably supported on a shaft mounted on a base, an electric drive means and speed reduction gear mechanism mounted on a frame of the mirror body, and a clutch gear mounted on the shaft so as to be fixed to the shaft when the mirror is electrically powered and to be free of the shaft when the mirror is forcibly rotated. The erected state and the folded state of the mirror body are maintained by engaging recesses formed on a shaft base portion with steel balls which are arranged on the frame root portion or on the undersurface of the clutch gear.

In electrically powered foldable outer rearview mirrors as described hereinbefore, as disclosed by Japanese Published Patent No. Hei 3-16841, several steel balls are provided on a frame (or a bracket) root portion in the mirror body, while first and second recesses are provided in the shaft base portion according to the erected mirror position and folded mirror position. The steel balls are engaged in the first and second recesses in the respective mirror erected and folded mirror position. When the mirror body is rotated, each steel ball is rotated on a sliding surface of the shaft base extending through the recesses. Also in another system disclosed in Published Japanese Utility Model Registration Application No. Hei 3-69552, the clutch gear is provided between the frame root portion and the shaft base portion and several steel balls are arranged between the upper surface of the clutch gear and the frame root portion, and between the lower surface of the clutch gear and the shaft base portion, respectively.

In a conventional system for automatically folding the outer rearview mirror, however, chattering of the mirror surface occurs, which is caused by a vertical movement of the mirror body during rotation because:
1. the clutch gear or a stopper plate is arranged between the shaft and the frame and the positioning of the mirror and the shock avoidance properties are determined by the steel balls so that the system does not have good stability and chattering is easily caused by inaccurate engagement of the parts of the operating mechanism during vehicle operation;
2. the clutch gear or the stopper plate is provided between the shaft and the frame so that the system is not waterproof and dustproof;
3. the frame moves vertically when the mirror is electrically rotated to erect and fold the mirror body and the mirror body can be forcibly rotated; and
4. in the system described by Published Japanese Patent Application No. Hei 3-16841, both clutches are simultaneously released at the time the mirror is forcibly rotated so that the gear teeth bear a much heavier load.

SUMMARY OF THE INVENTION

It is an object of the present invention to provide an electrically powered foldable outer rearview mirror for a motor vehicle in which the frame is prevented from moving vertically during electrical rotation of the mirror to erect or fold it or during forced rotation of the mirror to relieve the load on the gear teeth.

According to the present invention, the electrically powered foldable outer rearview mirror comprises a shaft having a shaft base portion mounted on a base; a mirror body rotatably mounted on the shaft and having a mirror erected position and a mirror folded position; a frame fixed to the mirror body and having a root portion provided with a throughgoing hole through which the shaft extends and having an upper surface and an undersurface acting as a bearing surface for the shaft base portion; a stop element provided between an undersurface of the frame root portion and the shaft base portion for determining a forward and rearward boundary of the mirror folded position; electric drive means for rotating the mirror body around the shaft and a speed reduction gear mechanism connected to the electric drive means, the electric drive means and the speed reduction gear mechanism respectively fixed to the frame and the speed reduction gear mechanism having a final stage gear; a clutch gear mounted on the shaft and engaged with the final stage gear of the speed reduction gear mechanism; and clutch means for avoiding shocks due to halting motion of the mirror body located on an upper surface of the clutch gear and clutch means for halting the mirror body in the mirror erected position located on an undersurface of the clutch gear, the clutch means for halting the mirror body in the mirror erected position being mounted not between the frame root portion and the shaft base portion but on the upper surface of the frame root portion and engaged in the frame root portion upper surface to prevent the frame from vertically moving when the mirror body is electrically rotated and forcibly rotated.

The clutch means for avoiding shocks due to halting motion of the mirror body includes a plurality of ball retaining recesses provided in the upper surface of the clutch gear and arranged circumferentially disposed on the clutch gear upper surface, a ball guide mounted on the shaft and spaced from the upper surface of the clutch gear and formed with a plurality of circumferentially disposed throughgoing holes and a plurality of steel balls engaged in the throughgoing holes of the ball guide, so the steel balls are movable over the clutch gear upper surface so as to pass over the ball retaining recesses when the mirror body is forcibly rotated and so they are engaged in the ball retaining recesses when the clutch means for avoiding shocks due to halting motion of the mirror body is not released.

The clutch means for halting the mirror body in the mirror erected position includes teeth formed along a circumferential direction on the clutch gear undersurface, a plurality of ball holding recesses formed in the frame root upper surface and a plurality of steel balls provided between the undersurface of the clutch gear and the frame root upper surface for engagement with the teeth and the ball holding recesses.

When the motor is operated the final stage gear of the speed reduction gear mechanism engaged with the clutch gear rotates and the clutch gear is then rotated. When the final stage gear rotates and the clutch means for avoiding shocks due to halting the mirror body is engaged or "on", so that the balls are engaged in the ball retaining recesses, the mirror body is electrically driven to rotate toward an erected or folded position. When the mirror body is rotated to the erected state from the folded state, the electric drive means is halted by operation of the clutch means for halting the mirror body in the mirror erect position and the rotation of the mirror body is halted to keep it in the erected position.

When the mirror body is forcibly rotated, the clutch gear and the final stage gear of the speed reduction gear mechanism are not disengaged and rotate together with the mirror body. When the mirror body is forcibly rotated, only the clutch means for avoiding shocks due to halting the mirror body located on the upper surface of the clutch gear is released. When this clutch means is released, the steel balls of it move on the upper surface of the clutch gear after leaving the ball retaining recesses on the clutch gear upper surface and they slide up in the throughgoing holes of the ball guide so that the shock avoidance clutch means is released. After the mirror body is forcibly rotated and is electrically moved again, since the shock avoidance clutch means has been already released, the clutch gear runs idle on the shaft and the steel balls run over the teeth of the gear undersurface and drop into the ball holding recesses so that the mirror body can

BRIEF DESCRIPTION OF THE DRAWING

The objects, features and advantages of the present invention will now be illustrated in more detail by the following detailed description, reference being made to the accompanying drawing in which.

DESCRIPTION OF THE PREFERRED EMBODIMENTS

Figure 1:
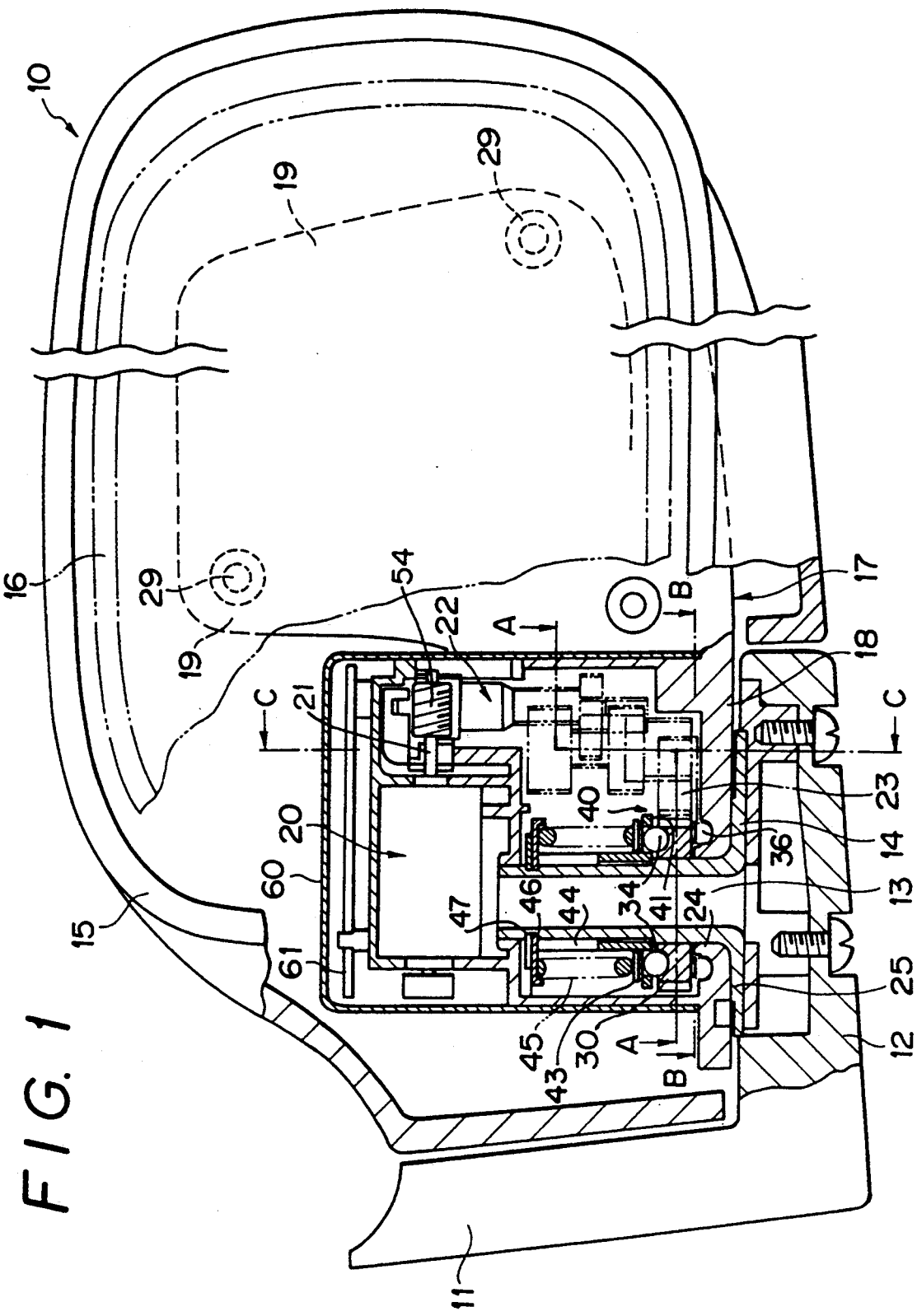
FIG. 1 is a longitudinal cross-sectional view of an outer rearview mirror according to the invention.
Figure 2:
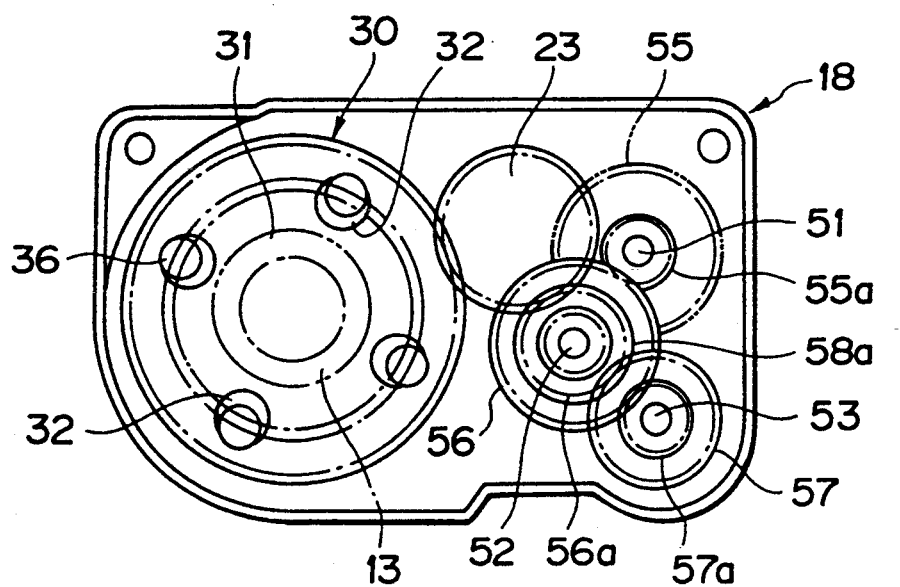
FIG. 2 is a transverse cross-sectional view through the rearview mirror of FIG. 1 taken along the section line A—A of FIG. 1.

An electrically powered foldable outer rearview mirror assembly for a motor vehicle according to the invention is shown in FIG. 1.

In the electrically powered foldable outer rearview mirror assembly 10 according to the invention, a mirror body 15 is rotatably supported on a hollow shaft 13 which is mounted on an extended part 12 of a base 11. An electric drive means (motor) 20 and a speed reduction gear mechanism 22 are respectively accommodated in a root portion 18 of a frame fixed to the mirror body 15. A clutch gear 30 is provided around the periphery of the shaft so as to be fixed to the shaft when the mirror body 15 is electrically folded and to be free of the shaft when the mirror body is forcibly rotated. A worm 54 is mounted on an output shaft 21 of the motor 20 to be connected with the speed reduction gear mechanism 22 and the final stage gear 23 of the speed reduction gear mechanism 22 is engaged with the clutch gear 30 mounted on the shaft 13. In FIG. 1, a sealing cap 60 covers the whole electric drive means 20 and a printed circuit board 61 for a motor control circuit.

The frame 17 comprises the root portion 18 provided with a hole 24 through which the shaft 13 extends and a wing portion 19. The wing portion 19 is secured on an inner wall of the mirror body 15 by several screws. A mirror element 16 is mounted in the mirror body 16 via an actuator unit (not shown) for adjusting a reflecting angle of the mirror. For enabling a smooth rotation about the shaft, the undersurface of the root portion 18 of the frame provides a bearing surface 25 for a shaft base portion 14 of the shaft 13.

Figure 3:
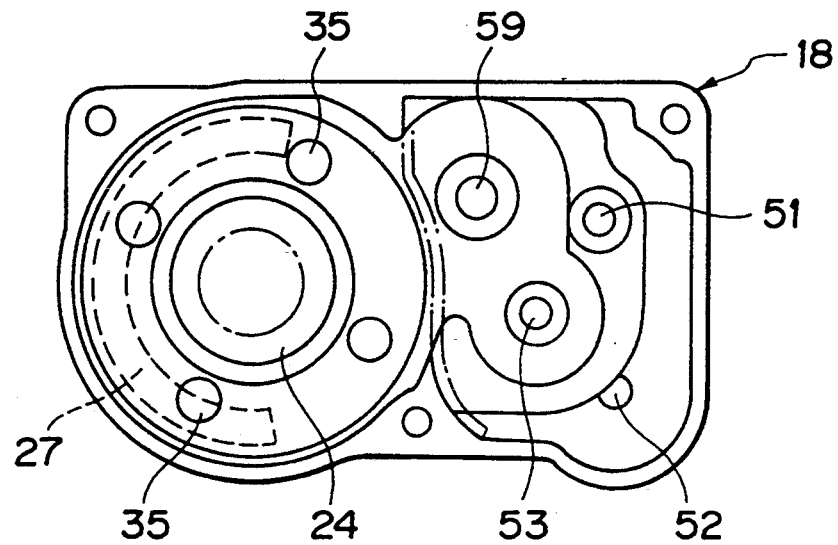
FIG. 3 is a transverse cross-sectional view through the rearview mirror of FIG. 1 taken along the section line B—B of FIG. 1.
Figure 4:
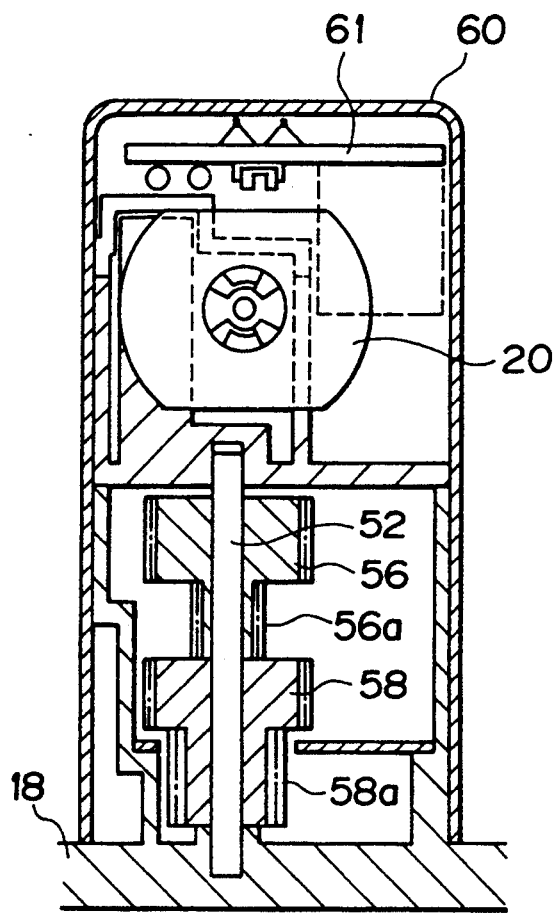
FIG. 4 is a longitudinal cross-sectional view through the rearview mirror of FIG. 1 taken along the section line C—C of FIG. 1.
Figure 6:
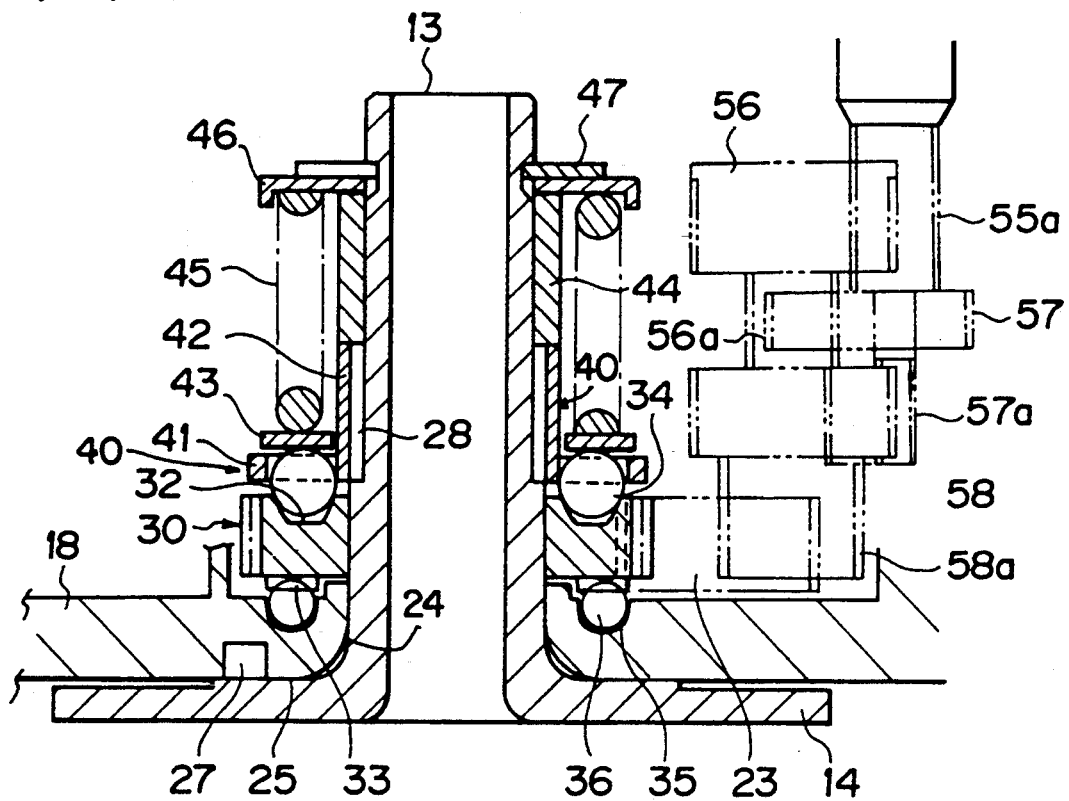
FIG. 6 is a detailed longitudinal cross-sectional view of essential parts of the rearview mirror of FIG. 1.
Figure 8:
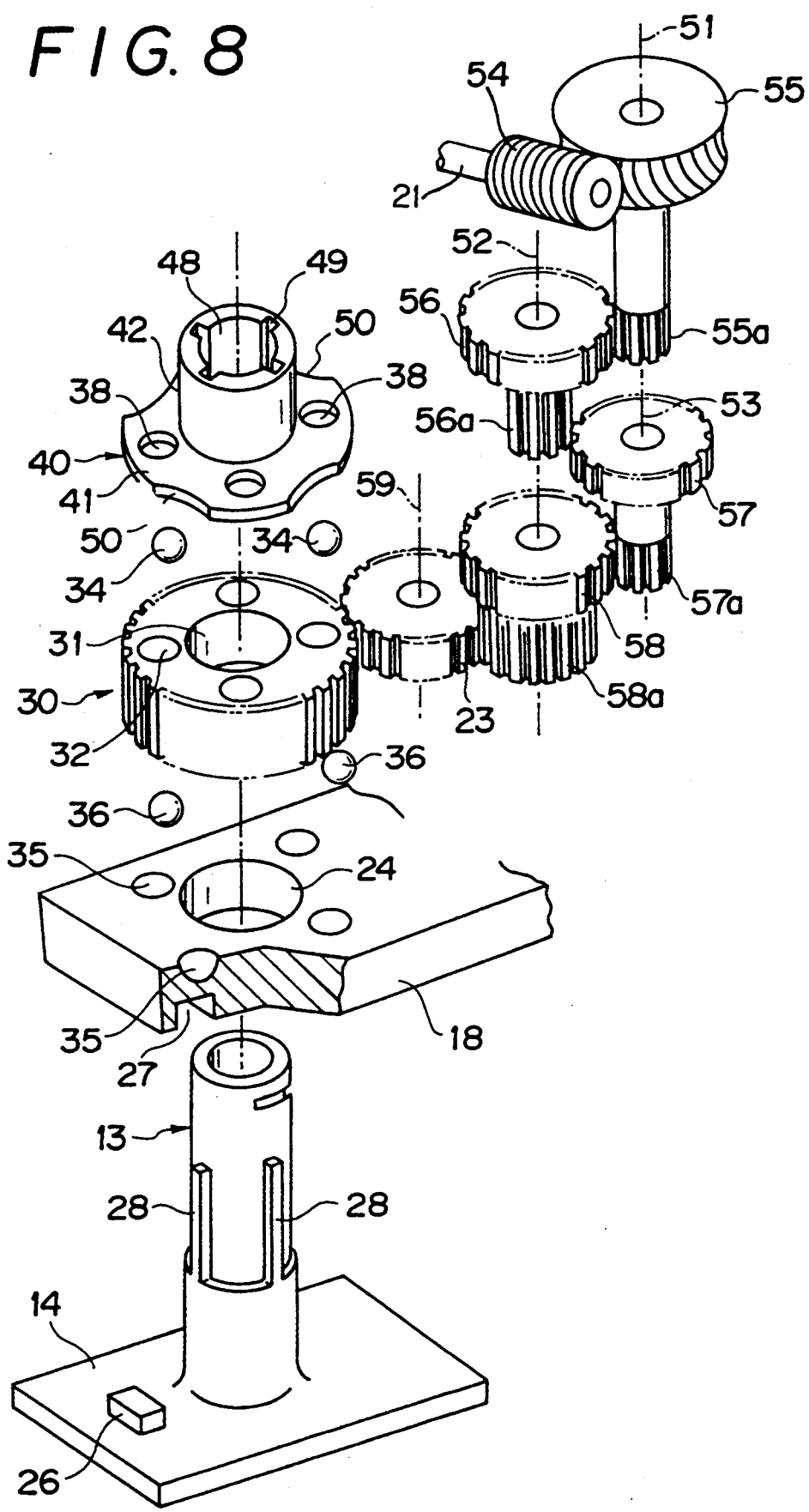
FIG. 8 is an exploded perspective view of essential parts mounted on a shaft including a speed reduction gear mechanism in the rearview mirror of FIG. 1.

The clutch gear 30, a ball guide 40, a washer 43, a sleeve 44, a coil spring 45, a spring retainer 46 and a fastener 47 are mounted in that order on the shaft 13 which penetrates through the hole 24 in the frame root portion. Steel balls 34, 36 are mounted between a plate portion 41 of the ball guide 40 and an upper surface of the clutch gear and also between the undersurface of the clutch gear and the upper surface of the frame root portion 18 (See FIG. 1 and FIG. 6). For determining a position to which the mirror body is rotated, a stop element 26 (see FIG. 8) is provided protruding from the shaft base portion 14 and a guide groove 27 having an arc-shaped plane surface is formed in the undersurface of the frame root portion 18 to engage with the stop element 26 (FIGS. 3 and 8). Although it is not shown in the embodiment in the drawing, alternatively, it is possible to form the recess of the shaft base portion 14 and to provide the stop element on the undersurface of the frame root portion 18. In the present embodiment the motor is transversely mounted on the frame provided in the mirror body. Although it is not so mounted in the present embodiment, it is possible to mount the motor vertically on the frame with the output shaft downwardly directed to engage the pinion with the speed reduction gear. FIG. 6 is a detailed longitudinal cross-sectional view of the apparatus in FIG. 1. FIG. 8 is an exploded perspective view of a plurality of parts around the shaft including a number from the speed reduction gear mechanism, however respective washer 43, sleeve 44, coil spring 45, spring retainer 46 and fastener 47 are eliminated therefrom. As shown in FIGS. 6 and 8, several protruding elements 28 are provided around the shaft 13 extending in the direction of the shaft axis for mounting the ball guide 40 and grooves 49 are formed through the hole 48 to receive and engage with the protruding elements 28 so that the ball guide 40 is held nonrotatably on the shaft 13. A plurality of throughgoing holes 38 (four holes in FIG. 8) are formed on the circumference of the plate 41 of the ball guide 40 and arc shaped cutouts 50 are also formed in the outer periphery of the plate portion 41 for avoiding engagement with the final stage gear 23.

The clutch gear 30 is provided with a hole 31 (see FIG. 8) in a center thereof for receiving the shaft 13 and is formed with a clutch means for avoiding shocks due to halting the mirror body on the upper surface thereof and a clutch means for halting the mirror body in a mirror erected position on the undersurface thereof respectively.

The clutch means for avoiding shocks due to halting the mirror body comprises a plurality of ball retaining recesses 32 circumferentially disposed in the upper surface of the clutch gear 30, the ball guide 40 mounted on the shaft 13 spaced from the upper surface of the clutch gear and having a plurality of throughgoing holes 38 circumferentially disposed in a plate portion 41 thereof and a plurality of steel balls 34 engaged in the through-going holes 38. When this clutch means is engaged or "on", the steel balls 34 are engaged in the ball retaining recesses 32 and the clutch gear 30 is fixed on the shaft 13. When this clutch means is disengaged or released, the steel balls 34 are dislodged from the retaining recesses 32 and move over the upper surface of the clutch gear 30 and over the ball retaining recesses 32 which occurs when the mirror is forcibly rotated (FIGS. 6 and 8).

Figure 5:
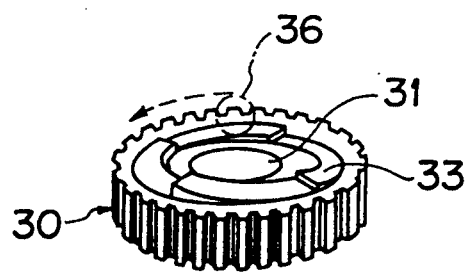
FIG. 5 is a perspective view of a rear side of a clutch gear according to the invention.
Figure 7:
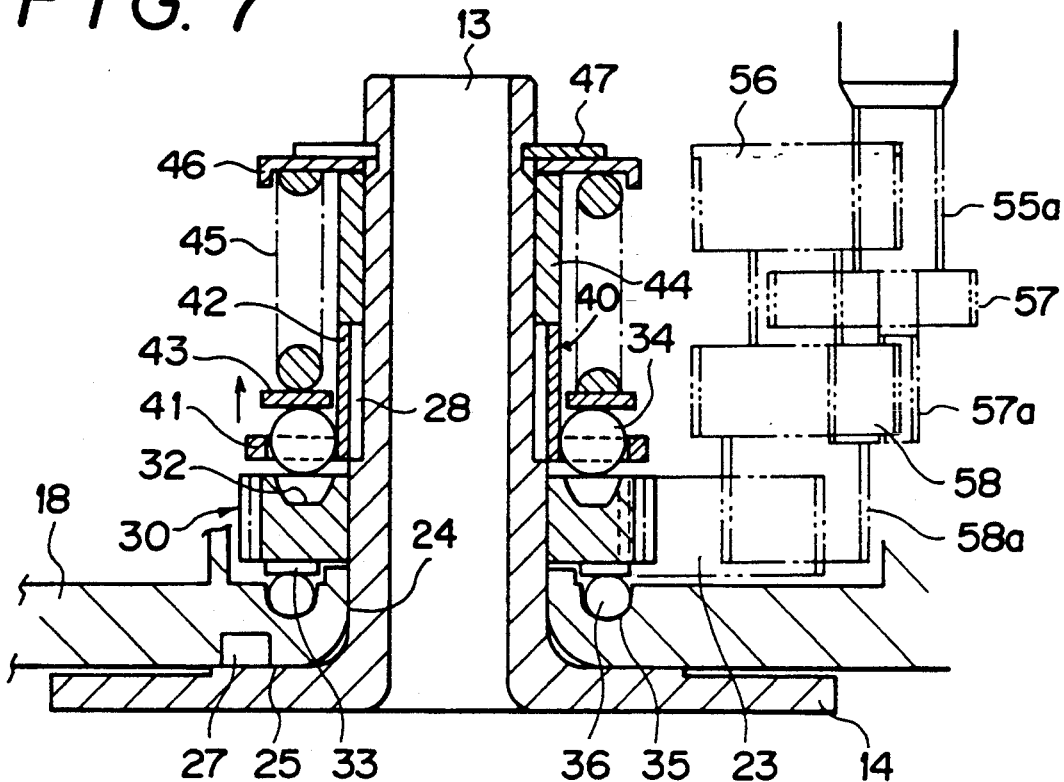
FIG. 7 is another detailed longitudinal cross-sectional view of essential parts of the rearview mirror of FIG. 1.

Furthermore the clutch means for halting the mirror body in the mirror erected position includes a plurality of teeth 33 circumferentially disposed on the undersurface of the clutch gear 30, a plurality of ball holding recesses 35 formed on the upper surface of the frame root portion 18 and a plurality of steel balls 36 mounted between the undersurface of the clutch gear 30 and the upper surface of the frame root portion 18 and engagable with the teeth 33 so that the steel balls 36 can be engaged in the ball holding recesses 35 (FIGS. 5 and 7).

The structure of the gears of the speed reduction gear mechanism 22 connected to motor 20 is not limited to one embodiment illustrated by FIGS. 2 to 4 and FIG. 8. In the embodiment of the speed reduction gear mechanism 22 illustrated in the drawing, gears mounted for rotation around first to the fourth axes 51 to 53 and 59 are provided. The worm wheel 55 is supported rotatable around first axis 51 and engages with the worm 54 which is fixed to the output shaft 21 of the motor 20. The worm wheel 55 is connected nonrotatably and coaxially with the twin gear 55a, which is engaged with a first intermediary gear 56 rotatable about the second axis 52 and having a coaxial twin gear 56a, which, in turn, is engaged with a second intermediary gear 57 rotatable about the third axis 53 and having a twin gear 57a. The twin gear 57a drives, in turn, the third intermediary gear 58 coaxial with the first intermediary gear 56 and having the connected twin gear 58a engaged with final stage clutch gear 23 rotatable about the fourth axes 59. The final stage gear 23 is engaged with and drives clutch gear 30.

As described hereinabove, the contact of the frame and the shaft 13 is composed in a surface contact in which the clutch gear 30 composed of the locating clutch means and the shock avoidance clutch means on both surfaces is disposed on the frame root portion. In operation of the device described above, when the motor 20 is electrically actuated, the final stage gear 23 of the speed reduction gear mechanism 22, which engages the clutch gear 30, is driven rotatably. During the rotation of the final stage gear 23, since the steel balls 34 on the upper surface of the clutch gear 30 are engaged in the ball retaining recesses 32 and the clutch means for avoiding shocks due to halting the mirror body is kept "on" or engaged, the mirror body is rotated by the motor 20 into the erected state or the folded state and is stopped in the erected or folded position by operation of the clutch mechanism. That is, when the mirror body is rotated by the motor 20, the clutch means for avoiding shocks due to halting or stopping of the mirror body comprising the recesses 32 of the upper surface of the clutch gear 30, steel balls 34 and the plate portion 41 of the ball guide 40, is maintained in an "ON" or engaged condition, so that the clutch gear 30 is fixed on the shaft 13 and then the final stage gear 23, that is, the frame 17, rotates around the clutch gear 30.

When the mirror body 15 is folded, the stop element 26 engages in the guide groove 27 (as shown in FIG. 8), so that the motor 20 is locked to halt it. When the mirror body 15 is being erected, the motor is locked to halt it after the steel balls 36 contact with teeth 33 of the undersurface of the clutch gear 30. In this state, the output torque of the final stage gear 23 is adjusted for rotation in one direction, but not in the opposite direction.

When the mirror body 15 is forcibly rotated, the engagement of the clutch gear 30 with the final stage gear 23 of the speed reduction gear mechanism 22 is not released and they rotate with the mirror body. The locating clutch means comprises steel balls 36 engaged in the ball holding recesses 35 of the frame root portion 18 and the teeth 33 of the undersurface of the clutch gear 30 and cannot be released when the frame position is changed. In releasing the clutch means for avoiding shocks due to halting the mirror body, the steel balls 34 are rotated on the upper surface of the clutch gear 30 running over the ball retaining recesses 32 on the upper surface of the clutch gear and are held in the through-going holes 38 which are formed on the plate portion 41 of the ball guide and thereafter the steel balls 34 slide over the clutch gear upper surface, so that the shock absorbing clutch means is released or not engaged. After the mirror body 15 is forcibly rotated, when the mirror body 15 is rotated by the motor 20 again, since the shock avoidance clutch means (i.e. means for avoiding shocks due to halting of the mirror body) has been already released, the clutch gear 30 runs idle with respect to the shaft 13 to let the steel balls 36 run over the teeth 33 of the gear undersurface so that the steel balls 34 fall into the ball retaining recesses 32 so that the mirror body 15 is folded.

According to the present invention, the bearing of the frame and the shaft base is a surface bearing so that the improved electrically foldable outer rearview mirror resists chattering and has an improved vertical frame movement when the mirror body is rotated by the electric motor. Also the locating clutch means is not released when the mirror body is forcibly rotated by hand so that gear teeth do not bear a burden. The clutch gear of the rearview mirror which has both clutch means mounted on the upper part of the frame root portion provides water resistance and dust resistance properties to the structure. The number of assembly steps has been reduced and a compact mirror structure has resulted.

While the invention has been illustrated and embodied in an electrically powered foldable outer rearview mirror for a motor vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is:

1. An electrically powered foldable outer rearview mirror comprising:
   a base;
   a shaft mounted on the base and having a shaft base portion;

a mirror body rotatably mounted on the shaft and having a mirror erected position and a mirror folded position;

a frame fixed to the mirror body, said frame having a root portion provided with a throughgoing hole through which the shaft penetrates, said root portion having an upper surface and an undersurface acting as a bearing surface for the shaft base portion;

a stop element provided between the undersurface of the frame root portion and the shaft base portion for determining a forward and rearward boundary of the mirror folded position;

electric drive means for rotating the mirror body around the shaft and a speed reduction gear mechanism connected to said electric drive means, said electric drive means and said speed reduction gear mechanism fixed to the frame and said speed reduction gear mechanism having a final stage gear;

a clutch gear mounted on the shaft and engaged with said final stage gear of the speed reduction gear mechanism;

clutch means for avoiding shocks due to halting motion of the mirror body located on an upper surface of the clutch gear and clutch means for halting said mirror body in a mirror erected position located on an undersurface of the clutch gear, said clutch means for halting said mirror body in the mirror erected position being mounted not between the frame root portion and the shaft base portion but on said upper surface of the frame root portion and engaged in the frame root portion upper surface to prevent the frame from vertically moving when the mirror body is electrically rotated and forcibly rotated;

wherein said clutch means for avoiding shocks due to halting motion of the mirror body includes a plurality of ball retaining recesses provided in the upper surface of the clutch gear and arranged circumferentially disposed on the clutch gear upper surface, a ball guide mounted on the shaft, spaced from the upper surface of the clutch gear and provided with a plurality of circumferentially disposed throughgoing holes, and a plurality of steel balls engaged in said throughgoing holes of said ball guide, said steel balls being movable over the clutch gear upper surface so as to pass over the ball retaining recesses when the mirror body is forcibly rotated and being engaged in said ball retaining recesses when said clutch means for avoiding shocks due to halting motion of the mirror body is engaged; and wherein said clutch means for halting said mirror body in the mirror erected position includes a plurality of teeth formed along a circumferential direction on the clutch gear undersurface, a plurality of ball holding recesses formed in the frame root upper surface and a plurality of steel balls provided between said undersurface of said clutch gear and said frame root upper surface for engagement with said teeth and said ball holding recesses.

2. The electrically powered foldable outer rearview mirror as defined in claim 1, wherein the ball guide has a plate portion, the throughgoing holes of the ball guide being provided in said plate portion, and said clutch means for avoiding shocks due to halting motion of the mirror body, includes a washer, a sleeve, a coil spring, a spring retainer and a fastener; said washer, said sleeve, said coil spring, said spring retainer and said fastener being mounted one after the other on said shaft so that said spring urges said washer against said steel balls in said throughgoing holes of said ball guide and said spring is held in place on said shaft by said spring retainer and said fastener.

3. The electrically powered foldable outer rearview mirror as defined in claim 1, wherein the ball guide has a plate portion provided with a shaft receiving hole and the shaft has a plurality of protruding elements to receive and engage with grooves provided in the shaft receiving hole, and the plate portion is provided with said circumferentially disposed throughgoing holes to loosely hold said steel balls of said clutch means for avoiding shocks on the upper surface of the clutch gear.

* * * * *